United States Patent [19]

Bourin et al.

[11] Patent Number: 4,986,952
[45] Date of Patent: Jan. 22, 1991

[54] PROTECTION SYSTEM FOR PROTECTING A NUCLEAR REACTOR IN THE EVENT OF A REACTION-INHIBITING ELEMENT FALLING

[75] Inventors: Jean-Michel Bourin, Paris; Jean-Lucien Mourlevat, Noisy le Roi; Gilbert Sengler, Elancourt, all of France

[73] Assignee: Framatome, Courbevoie, France

[21] Appl. No.: 302,279

[22] Filed: Jan. 27, 1989

[30] Foreign Application Priority Data

Jan. 27, 1988 [FR] France .................. 88 00926

[51] Int. Cl.$^5$ .............................................. G21C 7/36
[52] U.S. Cl. ..................................... 376/215; 376/254; 376/259; 376/277
[58] Field of Search ............... 376/215, 254, 259, 277

[56] References Cited

U.S. PATENT DOCUMENTS

| | | | |
|---|---|---|---|
| 4,548,784 | 10/1985 | Watari | 376/216 |
| 4,752,869 | 6/1988 | Miller | 376/215 |
| 4,762,663 | 8/1988 | Cook | 376/215 |
| 4,832,898 | 5/1989 | Miranda | 376/215 |
| 4,843,537 | 6/1989 | Arita | 376/215 |

FOREIGN PATENT DOCUMENTS 0200999 12/1986 European Pat. Off. .

OTHER PUBLICATIONS

IEEE Transactions on Nuclear Science (see attached Search Report).
Revue Generale Nucleaire (see attached Search Report).

Primary Examiner—Donald P. Walsh
Attorney, Agent, or Firm—Pollock, Vande Sande & Priddy

[57] ABSTRACT

Protection against the consequences of a cluster of control rods falling accidentally is provided by four chains, each of which includes two neutron flux detectors (D1A, D1B), two primary treatment circuits (R1A, S1A and R1B, S1B) associated with said two detectors such that each provides a primary fall signal in the event of the flux measured by the corresponding detector decreasing rapidly, and an OR gate (P1) for providing an output fall signal from the chain in the event of at least one of said primary signals being present. The detectors (D1A, D4B, D3A, D1B, D2A, D3B, D4A and D2B) are angularly distributed around the vertical axis (A) of the core (2). A secondary treatment circuit (6) causes an emergency reactor stop to take place in the event that it receives fall signals at the outputs from at least two chains.

4 Claims, 3 Drawing Sheets

PROTECTION SYSTEM FOR PROTECTING A NUCLEAR REACTOR IN THE EVENT OF A REACTION-INHIBITING ELEMENT FALLING

The present invention relates to nuclear reactors.

In general, it applies under the following circumstances:

A reactor has a vertical axis. The nuclear reaction which takes place in the core of the reactor is accompanied by a neutron flux which is distributed around said axis (and vertically). Said core has vertical hollows distributed around said axis and it is provided with controllable reaction-inhibiting elements (control rods) capable of descending in said hollows in order to absorb said neutron flux, thereby controlling said nuclear reaction. As a result, an accidental fall of one of said reaction-inhibiting elements into one of said hollows locally absorbs said neutron flux and disturbs the neutron flux distribution around said axis. Continuing said nuclear reaction may then damage said core. That is why a protection system is provided. Such a system conventionally includes not less than three separate protection chains (for safety reasons). Each of these chains comprises:

a neutron flux detector disposed at a distance from said axis for measuring a local neutron flux which, in the event of one of said reaction-inhibiting elements falling, is subjected to a reduction, with the reduction being larger the nearer said detector is to the hollow in which said fall has taken place; and a primary treatment circuit associated with said detector for providing a primary fall signal solely when the neutron flux measured by said detector is subjected to a reduction whose rate of decrease exceeds a predetermined speed threshold.

Said detectors are angularly distributed around said axis.

Said system further includes a secondary treatment circuit receiving the fall signals output by said protection chains and providing a secondary fall signal solely on receiving not less than two of said fall signals from two respective chains, thereby reducing the risk of such a secondary fall signal being provided when one of said reaction-inhibiting elements has not fallen; and means for limiting said nuclear reaction in the event that said secondary fall signal is provided.

More specifically, consider the case of one or more clusters of control rods, i.e. reaction-inhibiting elements, falling into the core of a nuclear reactor of the pressurized water (PWR) type. The consequence of such a fall is to disturb the distribution of neutron flux in the core. This disturbance may be very large and could give rise to the crisis of the water boiling, thereby damaging the fuel rods, unless protective measures are undertaken. One such protective measure consists, in particular, in implementing said means for limiting the nuclear reaction.

With respect to this, and other risks, the electrical protection and safety members of a nuclear reactor are divided into four distinct groups referred to as protection chains. Each of these groups is independent from the other groups. They are powered from distinct power supplies and they are located in separate premises. The cables interconnecting the various components of a given group follow paths which are different from and separate from the paths used by the other groups.

The power of the reactor is measured by short response time neutron flux detectors installed outside the reactor, and this measurement is used by the safety members. For reasons of bulk and positioning, there is only one detector per measurement point rather than four probes as in the case of other measurements. Each of these detectors is attributed to one of the protection chains.

In conventional manner, the core of the reactor is in the form of a square grid located within a circumscribing square. Relative to said circumscribing square, the four neutron flux detectors are placed on its diagonal axes (see FIG. 1). However, it should be understood that the system of the invention is equally applicable to a hexagonal grid reactor.

Reactor-protecting measures are undertaken when two of the four chains (2/4 logic) observe a rapid flux drop which is more negative than a threshold speed which is typically 2% to 3% of nominal flux per second. This speed is the derivative of the measured flux with respect to time, with said derivative being frequency filtered.

The threshold is passed almost immediately after the accident while the nuclear power is being transiently reduced by the falling cluster and before the feedback and regulation systems have had any substantial effect. Such feedback systems tend to re-establish equilibrium between the nuclear power and the power requested by the steam turbine which is conventionally powered by the nuclear reactor.

The core must be protected even if one of the four protection chains is faulty (single fault criterion). The normal presence of one or more neutron-absorbing clusters for limiting nuclear power in the core sets up a radial disturbance of the neutron flux which is acceptable, per se. However, it has been found that when one or more clusters fall accidentally, such a disturbance can greatly attenuate the fall-detecting signal from one or even two of the more distant detectors from the cluster or clusters which have fallen accidentally. Under such circumstances, only the closest two detectors deliver a meaningful signal. It is necessary to assume that one of these detectors is faulty. That is why, within the above-mentioned single fault criterion, it must be assumed that the protective measures required by some cluster falls will not in fact be performed because said falls will not be detected by the protection system. Such falls which may potentially not be reliably detected must be taken into account when dimensioning the boiler, and therefore lead to boiler performance being limited.

The particular object of the present invention is to improve the performance of a nuclear boiler by reducing the constraints imposed on the constructor by the risk of the protection system failing to detect the fall of a cluster.

The present invention provides a system which comprises, in conventional manner:

said protection chains;
said secondary treatment circuits; and
said means for limiting said nuclear reaction.
Compared with the above-described prior art system, the system of the invention is characterized by the fact that each of said protection chains includes:
at least two of said neutron flux detectors angularly separated by more than 90° about said axis;

two of said primary treatment circuits associated respectively with said two detectors for providing said primary fall signals; and an intermediate treatment circuit for receiving said primary fall signals and for providing an intermediate fall signal on receiving at least one primary fall signal from at least one of said two primary treatment circuits;

said fall signals provided at the outputs from said protection chains and received by said secondary treatment circuit being constituted by said intermediate fall signals, such that said secondary fall signal is provided in the event of one said reaction-inhibiting elements falling even if the resulting reductions in neutron flux received by a plurality of said detectors which are relatively far away from said hollow receiving said falling reaction-inhibiting element do not exceed said predetermined variation speed threshold, and even in the event of one of said chains being faulty so that it prevents one of said primary fall signals from a detector relatively close to said hollow being generated.

Preferably, when said reactor core has square symmetry in plan view, with the number of said protection chains being four, said detectors are angularly disposed around said axis at an angular pitch of 45°. Each of said protection chains then comprises two of said detectors which are angularly spaced by 135° or by 180° about said axis.

An implementation of the present invention in the context explained above is described in greater detail by way of non-limiting example with reference to the accompanying diagrammatic figures. When the same item appears in several figures, it is designated in all of them by the same reference symbol.

It should be understood that the items mentioned may be replaced by other items performing the same technical functions.

Figure 1:
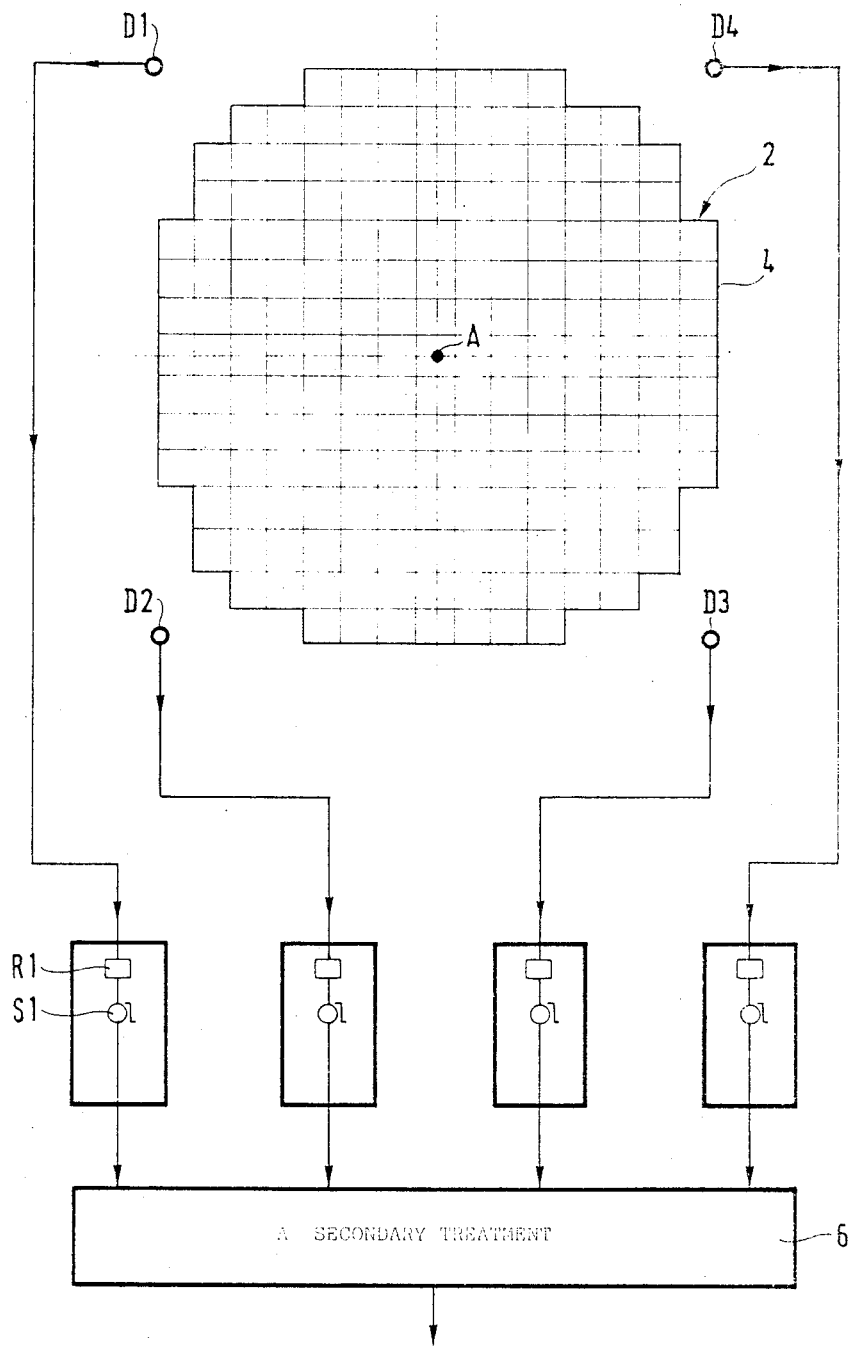
FIG. 1 is a view of the above-mentioned prior art system.

As shown in FIG. 1, a prior art pressurized water nuclear reactor comprises a core 2 having a vertical axis A. The plan of this core is in the form of a square grid whose edges constitute, in part, the above-mentioned circumscribing square. The corners of the square are omitted since they do not form parts of the core. That is why they are not shown. Only the middle portions such as 4 of the sides of the square are shown since they constitute parts of the edge of the core.

The core has two median axes parallel to pairs of its sides, and two diagonal axes parallel to its diagonals. Four neutron flux detectors D1, D2, D3, and D4 are disposed on the diagonal axes of the core, outside and close to the core. I.e., they are disposed around the vertical axis A at the following angular positions 45°, 135°, 225°, and 315° measured from an angular origin extending upwardly in the figure. Each of the four identical protection chains includes one of the detectors, for example the detector D1, together with a primary treatment circuit operating as a differentiator R1, followed by a threshold member S1. This circuit provides the above-mentioned primary fall signal, in the event that an accidental fall of a cluster of control rods has occurred in the vicinity of the detector, or even at a distance from the detector if the previously established neutron flux distribution makes that possible.

A secondary treatment circuit 6 receives the fall signals provided at the outputs from the four protection chains. These signals are said primary fall signals. The secondary circuit provides the above-mentioned secondary fall signal if it receives two signals at the outputs from said chains.

This secondary fall signal controls measures for protecting the reactor by means not shown which cause all of the control rods to fall almost immediately.

Starting from this prior system, a characteristic of the invention lies in using four additional detectors and in coupling them with the four conventional detectors within the protection chains.

These additional detectors are not necessarily identical to the four conventional detectors. They are situated on the median axes, and outside the core.

It is preferable for the detectors to be uniformly distributed, although an angular pitch of 45° is not absolutely necessary.

Figure 2:
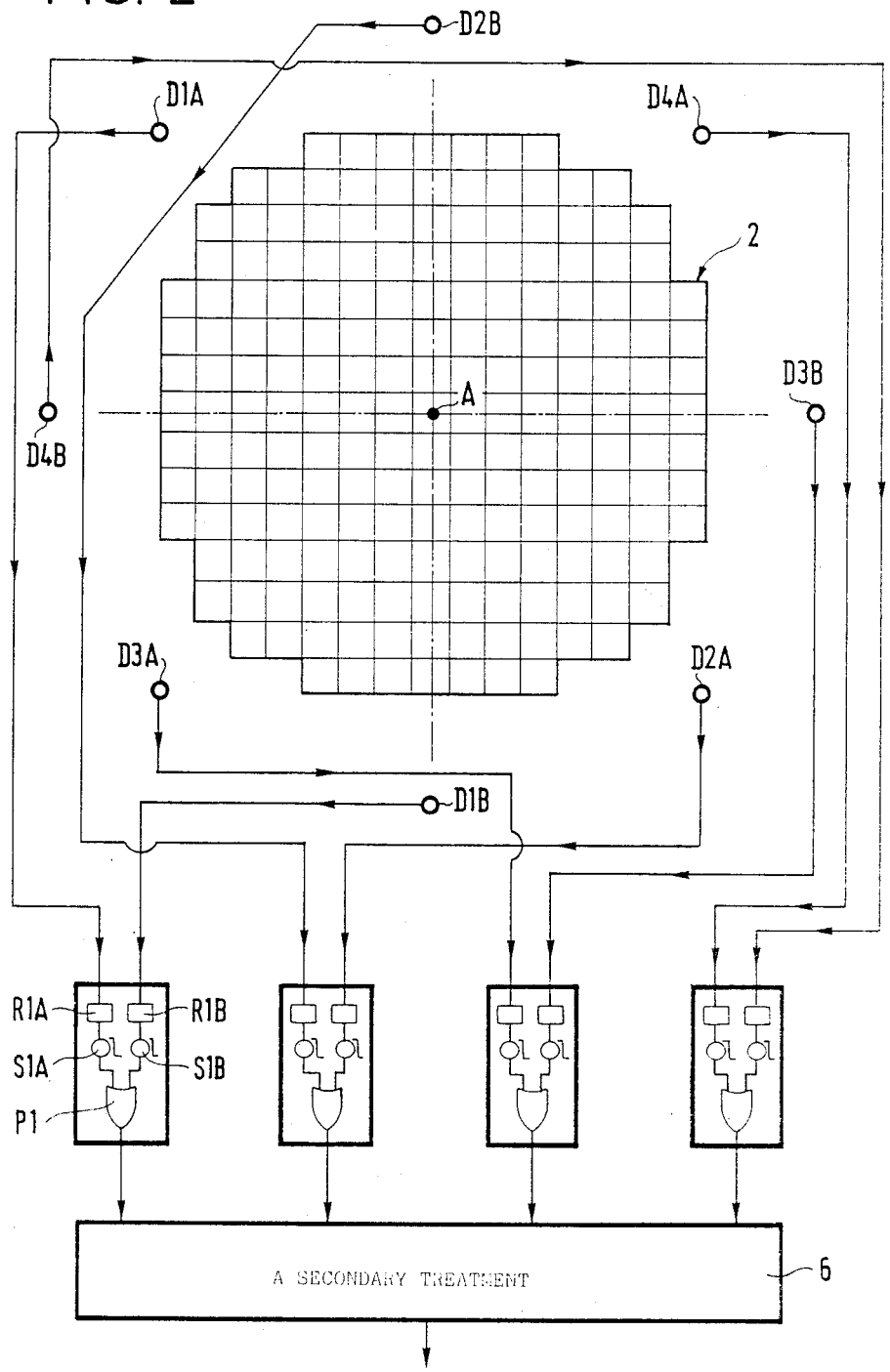
FIG. 2 is a view of a first system in accordance with a first embodiment of the invention.
Figure 3:
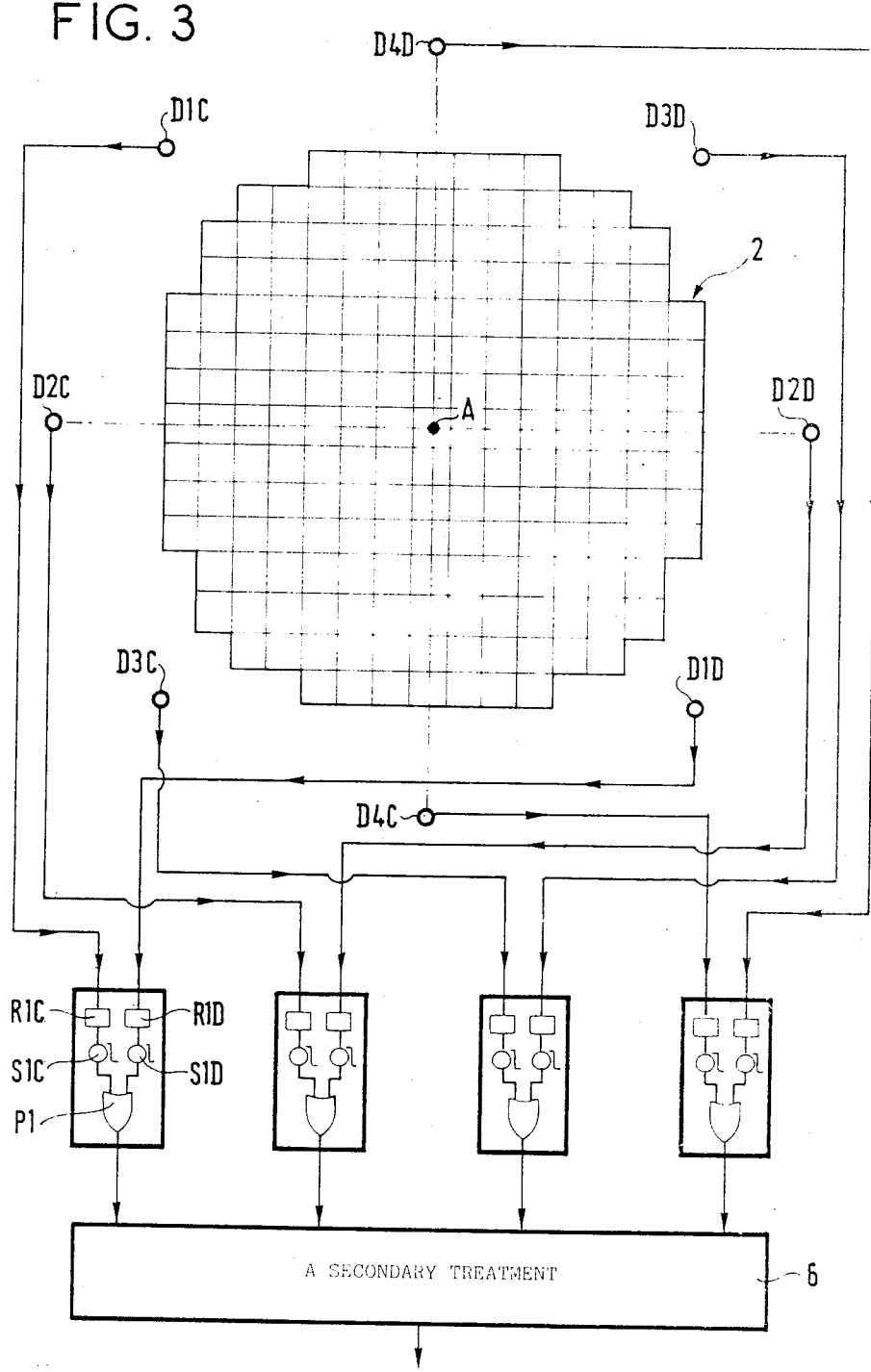
FIG. 3 is a view of a second system in accordance with a second embodiment of the invention.

The two systems shown in FIGS. 2 and 3 ensure that in the event of an accidental cluster fall, a minimum of three detectors belonging to three different protection chains will be in the proximity of the cluster(s), thus giving rise to a large fall signal. The system thus ensures 2/4 logic protection even in the event of one of the chains being faulty.

The two systems differ as follows:

The first system shown in FIG. 2 has the advantage of its chains being symmetrical: each chain has one diagonal detector and one median detector.

The second system shown in FIG. 3 is optimized with respect to the probability of detecting an accidental fall: four adjacent detectors always belong to four different chains.

However, the chains are not symmetrical with respect to the detectors:

two of the chains are fitted solely with diagonal position detectors, while the other two chains use median position detectors only.

One or other of these two solutions is selected depending on the characteristics of the detectors, which characteristics may depend on their median or diagonal position, and taking account of the fact that the treatment circuits used in accordance with the invention are typically incorporated in treatment units which provide protection functions other than those described above.

More specifically, and as shown in FIG. 2, the first system in accordance with the invention comprises eight detectors: D1A, D4B, D3A, D1B, D2A, D4A, and D2B at angular positions of 45°, 90°, 135°, 180°, 225°, 270°, 315°, and 360° respectively, with a single chain, e.g. the first, including two detectors D1A and D1B whose references include the same digit. In addition, each chain includes two primary treatment circuits R1A, S1A and R1B, S1B associated with respective ones of its two detectors, together with an intermediate treatment circuit P1 constituted by an OR gate. In the second system in accordance with the invention as shown in FIG. 3, the detectors are in the same positions as in the first system but in the following order: D1C, D2C, D3C, D4C, D1D, D2D, D3D, and D4D, with the digit likewise specifying the number of the chain to which the detector belongs.

For example, the first chain comprises primary treatment circuits R1C, S1C and R1D, S1D associated with the detectors D1C and D1D respectively, together with the intermediate treatment circuit P1. In other respects, this system is identical to the first.

We claim:

1. A protection system for protecting a nuclear reactor in the event of a reaction-inhibiting element falling, said system being applicable to a reactor having a vertical axis core which is the site of a nuclear reaction, said reaction being accompanied by a neutron flux which is distributed, at least angularly, around said axis, said core having vertical hollows distributed at least angularly around said axis and being provided with controllable reaction-inhibiting elements capable of descending in said hollows in order to absorb said neutron flux, thereby controlling said nuclear reaction, such that an accidental fall of one of said reaction-inhibiting elements into one of said hollows locally absorbs said neutron flux and disturbs the neutron flux distribution around said axis, and such that continuing said nuclear reaction may then damage said core, said system including not less than three separate protection chains, each of which comprises:

a neutron flux detector (D1) disposed at a distance from said axis (A) for measuring a neutron flux which, in the event of one of said reaction-inhibiting elements falling, is subjected to a reduction, with the reduction being larger the nearer said detector is to said hollow in which said fall has taken place; and a primary treatment circuit (R1, S1) associated with said detector (D1) for providing a primary fall signal solely when the neutron flux measured by said detector is subjected to a reduction whose rate of decrease exceeds a predetermined speed threshold;

said detectors being angularly distributed around said axis;

said system further including a secondary treatment circuit (6) receiving the fall signals output by said protection chains and providing a secondary fall signal solely on receiving not less than two of said fall signals from two respective chains, thereby reducing the risk of such a secondary fall signal being provided when one of said reaction-inhibiting elements has not fallen; and means for limiting said nuclear reaction in the event that said secondary fall signal is provided;

said system being characterized by the fact that each of said protection chains includes:

at least two of said neutron flux detectors (D1A, D1B) angularly separated by more than 90° about said axis (A);

two of said primary treatment circuits (R1A, S1A and R1B, S1B) associated respectively with said two detectors for providing said primary fall signals; and an intermediate treatment circuit (P1) for receiving said primary fall signals and for providing an intermediate fall signal on receiving at least one primary fall signal from at least one of said two primary treatment circuits;

said fall signals provided at the outputs from said protection chains and received by said secondary treatment circuit (6) being constituted by said intermediate fall signals, such that said secondary fall signal is provided in the event of one said reaction-inhibiting elements falling even if the resulting reductions in neutron flux received by a plurality of said detectors which are relatively far away from said hollow receiving said falling reaction-inhibiting element do not exceed said predetermined variation speed threshold, and even in the event of one of said chains being faulty so that it prevents one of said primary fall signals from a detector relatively close to said hollow being generated.

2. A system according to claim 1, said system being applicable to a reactor whose core (2) has the same symmetry about said axis (A) as a square about its center;

the number of said protection chains (DIA, R1A, S1A, D1B, R1B, S1B, P1) being four; and said detectors (D1A, D4B, D3A, D1B, D2A, D3B, D4A, D2B) being angularly distributed around said axis at an angular pitch close to 45°.

3. A system according to claim 2, characterized by the fact that each of said protection chains (DIA, R1A, S1A, D1B, R1B, S1B, P1) includes two of said detectors (D1A, D1B) which are separated by an angle of 135° about said axis (A).

4. A system according to claim 2, characterized by the fact that each of said protection chains (D1C, R1C, S1C, D1D, R1D, S1D, P1) includes two of said detectors (D1C, D1D) which are separated by an angle of 180° about said axis (A).

* * * * *